(12) United States Patent
van Heyden et al.

(10) Patent No.: US 8,358,045 B2
(45) Date of Patent: Jan. 22, 2013

(54) WINDING ARRANGEMENT FOR AN ELECTRICAL MACHINE

(75) Inventors: Marcus van Heyden, Dittelbrunn (DE); Alexander Gehring, Haβfurt-Unterhohenried (DE); Ralf Rönnebeck, Schonungen-Forst (DE); Florian Leberfinger, Veitshöchheim (DE); Frank Kewes, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 304 days.

(21) Appl. No.: 12/220,361

(22) Filed: Jul. 24, 2008

(65) Prior Publication Data

US 2009/0189474 A1 Jul. 30, 2009

(30) Foreign Application Priority Data

Jul. 28, 2007 (DE) .......................... 10 2007 035 531

(51) Int. Cl.
*H02K 3/52* (2006.01)
*H02K 3/34* (2006.01)
(52) U.S. Cl. ............................ 310/194; 310/45; 310/215
(58) Field of Classification Search .................. 310/194, 310/215, 254, 214, 45
See application file for complete search history.

(56) References Cited

U.S. PATENT DOCUMENTS

| | | | | |
|---|---|---|---|---|
| 5,969,455 A | * | 10/1999 | Sakamoto | ..................... 310/194 |
| 6,127,753 A | * | 10/2000 | Yamazaki et al. | ............... 310/71 |
| 6,541,888 B2 | | 4/2003 | van Heyden et al. | |
| 6,590,310 B2 | * | 7/2003 | Takano | ................... 310/216.074 |
| 6,611,189 B2 | * | 8/2003 | Sigl | ................... 336/198 |
| 6,958,673 B2 | * | 10/2005 | Suzuki | .......................... 336/208 |
| 6,984,911 B2 | * | 1/2006 | Horie et al. | ..................... 310/194 |
| 7,122,934 B2 | * | 10/2006 | Yamamoto et al. | ..... 310/216.105 |
| 7,200,917 B2 | * | 4/2007 | Takano et al. | ................... 29/596 |
| 7,414,347 B2 | * | 8/2008 | Wang et al. | ................... 310/260 |
| 7,545,063 B2 | * | 6/2009 | Yoshida et al. | ................. 310/71 |
| 7,732,968 B2 | * | 6/2010 | Zimmer et al. | ............... 310/194 |
| 2002/0130582 A1 | * | 9/2002 | Oketani et al. | ................ 310/216 |
| 2009/0127970 A1 | * | 5/2009 | Tatematsu et al. | ............ 310/216 |

FOREIGN PATENT DOCUMENTS

| | | |
|---|---|---|
| DE | 100 02 485 | 8/2001 |
| DE | 103 17 749 | 1/2004 |
| JP | 63089041 A * | 4/1988 |

* cited by examiner

*Primary Examiner* — Burton Mullins
(74) *Attorney, Agent, or Firm* — Cozen O'Connor

(57) ABSTRACT

Presented is a winding arrangement for an electric machine that includes a laminated core that includes a yoke that includes a plurality of teeth each having flanks that form first wedge surfaces and a winding support area that has a trapezoidal cross-section. The arrangement further includes a coil winding, and a winding body configured to arrange the coil winding on one of the plurality of teeth. The coil winding has an inner area arranged opposite the first wedge surfaces and represents second wedge surfaces. The arrangement further includes a stop means disposed on the winding body and/or one of the plurality of teeth. The stop means is configured to limit movement of the winding body in a direction toward the yoke. The arrangement further includes a centering means configured to center the winding body on one of the plurality of teeth.

13 Claims, 6 Drawing Sheets

WINDING ARRANGEMENT FOR AN ELECTRICAL MACHINE

BACKGROUND OF THE INVENTION

1. Field of the Invention

The present invention relates to a winding arrangement for an electric machine.

2. Description of the Related Art

An electric machine is described in DE 103 17 749 A1, for example, where the coil windings are pushed directly onto and arranged on trapezoidal stator teeth. The coil windings can be mounted quickly and easily on the stator, and the distance between the tooth flanks and the coil windings can be decreased, which has the effect of increasing the efficiency of the electric machine. However, this arrangement of the coil windings is subject to the danger that, during the operation of the electric machine and under the action of the associated vibrations, the coil windings can shift position relative to the stator teeth and to the base of the slot formed between two adjacent teeth and, thus, damage a layer of impregnating agent provided there and the insulating sheath of the coil conductor. As a result, the electric machine is at risk of short-circuiting and failure. It has been discovered that in spite of the spatial proximity of the coil windings to the teeth, the efficiency of an electric machine equipped with trapezoidal teeth and coils cannot be increased to the anticipated degree.

SUMMARY OF THE INVENTION

Therefore, the task of the present invention is to create a winding arrangement for an electric machine according to which the coil windings are mounted on the teeth in an operationally reliable manner. In addition, the use of a winding arrangement of this type is intended to increase the efficiency of the electric machine.

The invention is based on the realization that, although the direct contact of the coil windings with the tooth flanks reduces the heat transfer distance, in cases where a laminated stator core or a laminated rotor core equipped with coils is subjected to an impregnation process, the impregnating agent cannot penetrate completely into the gap remaining between the tooth flank and the winding. As a result, the transport of heat out of the coil windings and into the teeth is impeded by the presence of air inclusions, and the efficiency of the electric machine therefore suffers a significant loss.

Therefore, the present invention is intended to provide a predetermined minimum distance between the flank of a tooth and the opposing inner area of the coil winding, where this distance cannot fall below the predetermined value during the installation of a prefabricated coil winding on a tooth. As a result, it is ensured that the coil winding cannot wedge itself against a tooth during installation in such a way that no impregnating agent can reach the interface area between the tooth flank and the winding or in such a way that damage could occur to an insulating layer located between the winding and the tooth or to an insulating sheath on the winding conductor. This minimum distance can be extremely small, measuring approximately 0.05 mm, for example, in the x direction, i.e., in the circumferential direction on the stator.

It is advantageous for the minimum distance to be calculated in such a way that an impregnating agent can enter the interface area as a result of capillary action and wet both the tooth and the winding coil essentially completely. The minimum distance, however, may not be too large. Otherwise, the impregnating agent used to impregnate the laminated core can run back out of the gap or interface area as a result of its relatively low viscosity and thus allow intermediate air spaces to form, which have an undesirable heat-insulating effect. Installing a coil winding by the use of a winding body significantly limits the danger of damage to the winding during its installation and during the operation of the electric machine, and at the same time it guarantees that all the coil windings to be arranged on a laminated core will be mounted in defined positions in the x-z plane. The winding body is injection-molded or die-cast of a plastic which can withstand the heat in the operating temperature range of the electric machine, preferably a thermosetting plastic such as PPS. The inventive winding arrangement can be used for linear electric machines and also for rotational machines.

With respect to the trapezoidal form of the teeth, the invention covers both asymmetric teeth and symmetric teeth, i.e., teeth with equal nonparallel sides, and also teeth with any desired design for the tip of the tooth. The coils can be wound using a winding conductor with any desired cross section, e.g., round, square, rectangular, or ribbon-like. Appropriately twisted conductors or stranded wire can also be used. A coil winding can be in the form of a prefabricated plug-in coil ready for mounting on the teeth. The coil winding also can be produced by winding the conductor around a tooth with the use of at least one winding body.

It is especially advantageous to provide compensating means on the winding body to compensate for the difference between the length of a tooth and the length of the coil winding mounted thereon. Consequently, the winding is held in place in the y direction, i.e., the direction perpendicular to the x-z plane. In the case of a rotational electric machine, the y direction describes the axial direction.

In one embodiment, the winding body comprises a winding area to accept the coil winding. The winding area is formed by a trapezoidal winding support and two sidepieces, which form the boundaries of the winding area and which are connected to the winding support. The sidepieces prevent the winding from sliding off in the radial direction, i.e., in the z direction.

A simple form of compensating means includes a deformable or shearable web, which is provided on the side of the winding support facing a tooth, and which is advantageously formed out of the material of the winding body. So that the coil winding can be placed easily on a tooth, the web can be provided with a feed bevel. For the purpose of length compensation, and to achieve firm seating, the web can be deformed or at least partially sheared off from the winding body as the winding body is being pushed into place.

A stop means for limiting the movement of the winding body in the direction toward the yoke and in a direction across the teeth can be formed on the winding body or on the yoke independent of the centering means as a separate component. It is advantageous, however, for the stop means to be formed on a winding body and/or on a tooth so that it has a positioning effect in both the x and z directions. In the case of a trapezoidal tooth, the tooth flanks and the edges, which slant toward each other, can be used to hold a winding body in place, in that an appropriately designed structure on the winding body engages with these edges.

According to another embodiment, recesses are formed in the tooth at the transitions between the end surface and the tooth flanks. Webs arranged on both sides of the winding support and extending as far as the yoke can engage in these recesses. In the case of a yoke formed out of a laminated core, recesses in the tooth can be provided very easily by forming one or more of the core sheets, which are located directly at the end surfaces of the stack, of sheets of somewhat reduced tooth width. In the case of a rotational machine, the result is that axial projections are formed on the end surfaces of the teeth.

If the webs on the winding support are designed as flanks, with one on each side, the winding support then covers not only the end surfaces of the tooth but also the axially outermost areas of the tooth flanks, i.e., outermost in the y direction. As a result, the entire section of the winding conductor in the area where the conductor has to be bent can be laid continuously and without producing kinks from the end surface of the tooth to the tooth flank, and it is thus impossible for the insulating sheath of the conductor to be deformed beyond a permissible extent and damaged.

It is also advantageous to design the winding support in the areas where the coil winding passes to the tooth flanks with a predetermined radius in the direction in which the winding conductor extends. This radius is less than or equal to a predetermined minimum bending radius of the winding conductor. In this regard, it is advantageous for the winding conductor not to pass from the winding support to the tooth flank until it has reached a point beyond the area where the winding conductor is bent, i.e., in a section laid without a change of direction, where the winding conductor is already heading toward the flank. This measure reduces the stress on the sensitive insulating sheath of the winding conductor.

To realize a defined capillary gap between the tooth flanks and the coil windings, the trapezoidal winding support is designed with a projection extending beyond the tooth flanks.

It is also advantageous for the sidepiece of the winding body arranged on the yoke side to have a support section, which extends at least partially over the yoke. This support area, which acts as a stop in the setting-down direction of a coil winding, prevents the coil winding from coming into direct contact with the yoke in the base of the slot and simultaneously prevents direct contact in the area of the tooth flanks.

In addition to the winding support having a defined position on the yoke of the electric machine, the winding support also has a locking device. The locking device arrests and captures the support on a tooth of the electric machine so that it cannot come loose unintentionally. The locking means can be designed so that a positioning in at least one direction in space is also achieved simultaneously. For example, the support can be fixed in the x-z plane, which in the case of a rotational machine describes the radial plane perpendicular to the axis of rotation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below with reference to the attached drawings.

DETAILED DESCRIPTION OF THE PRESENTLY PREFERRED EMBODIMENTS

Figure 1:
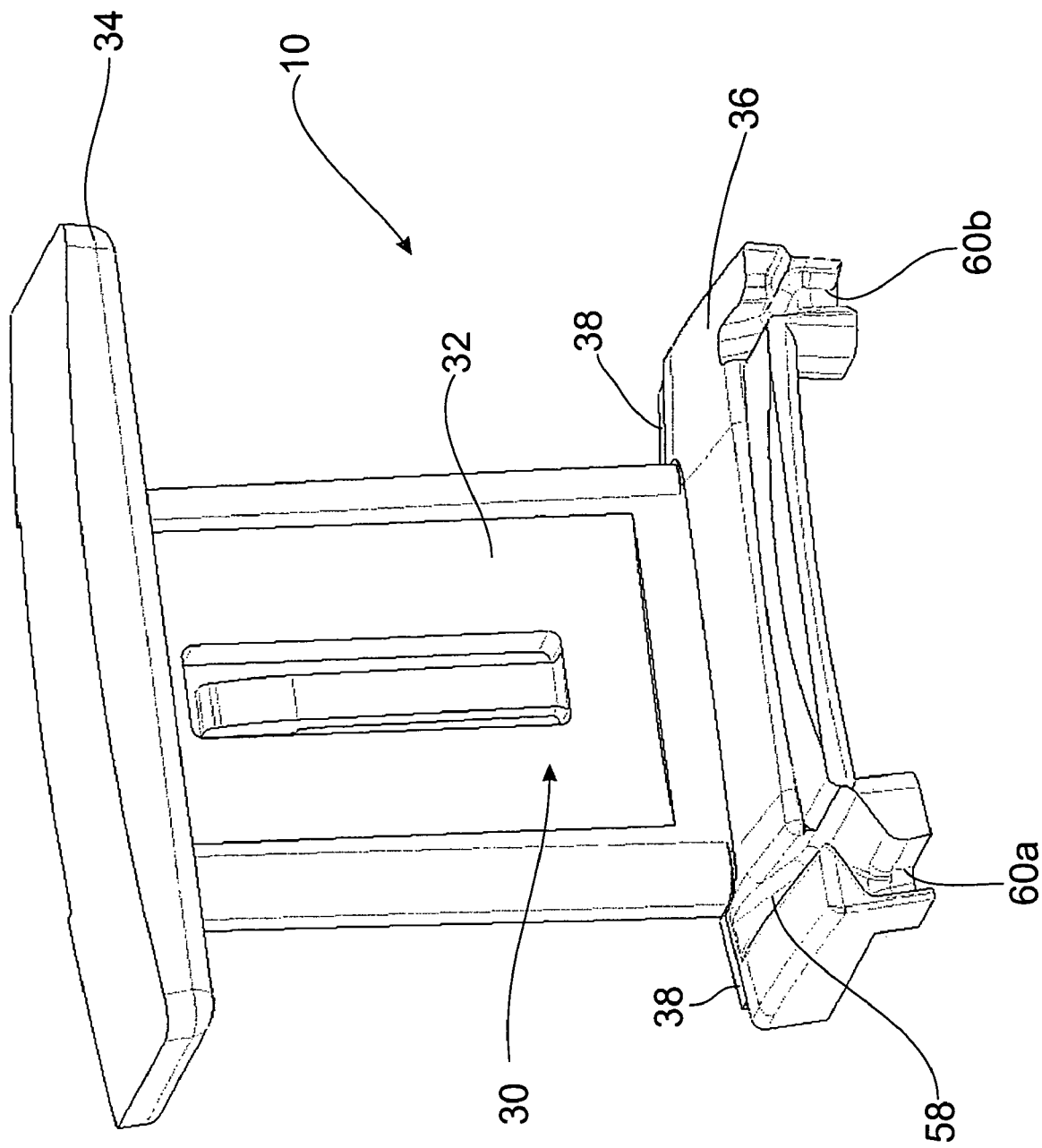
FIG. 1 is an illustrative perspective view of a winding body looking toward the winding area, according to one embodiment of the invention.
Figure 2:
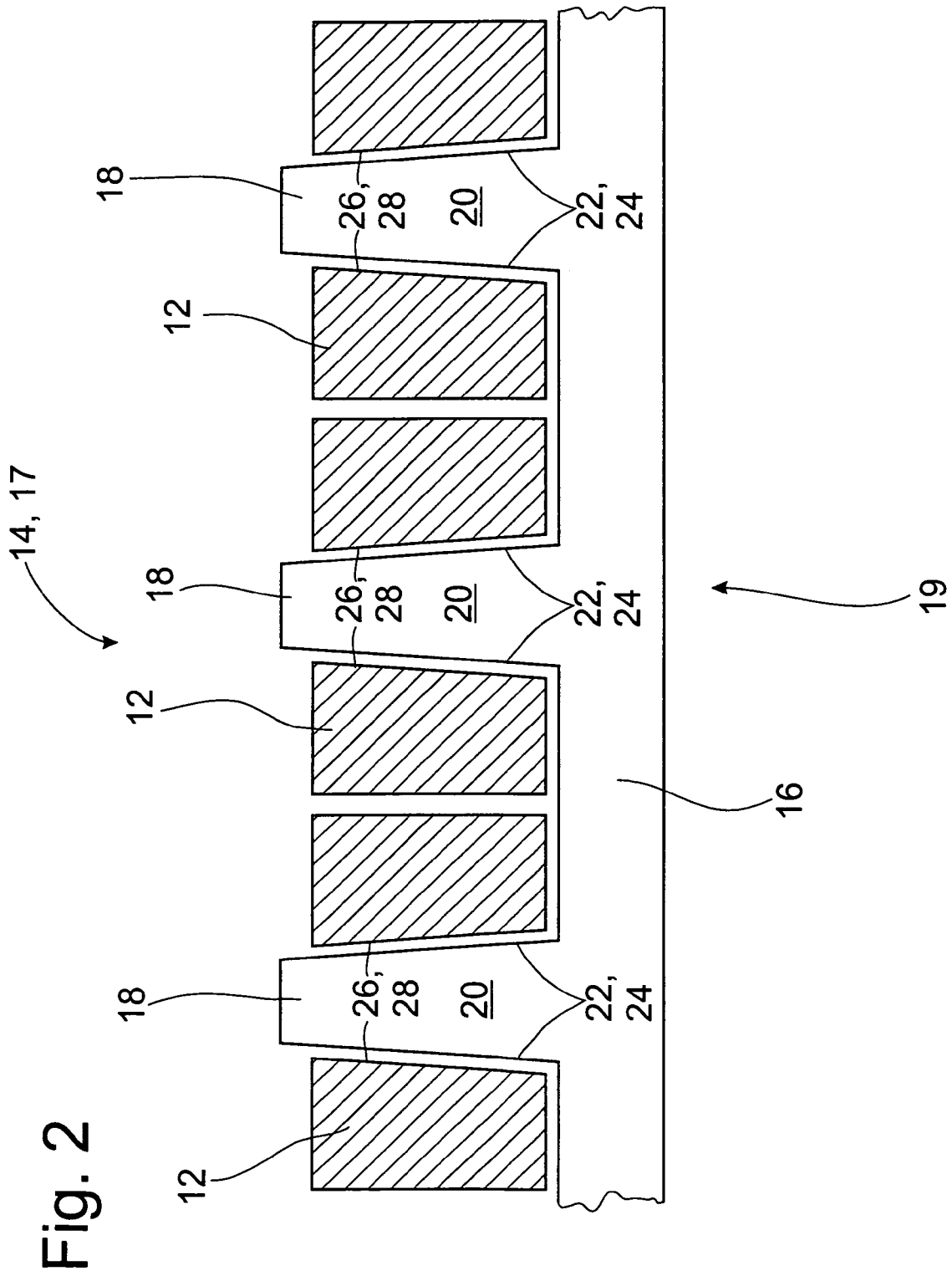
FIG. 2 is an illustrative schematic diagram of a stator with a yoke, trapezoidal teeth, and coil windings on the teeth, according to one embodiment of the invention.

Referring to FIG. 1, shown is a winding body 10, onto which, jointly with another winding body, a winding of a winding conductor is mounted to form a coil winding 12 for an electric machine 14 (see FIG. 2). The winding conductor used to form the coil winding can be, for example, a round, rectangular, or square conductor, or a conductor with any other desired cross section, or a twisted conductor.

FIG. 2 shows a yoke 16 of a stator 17. Teeth 18 project radially from the yoke 16. The prefabricated coil windings 12 are pushed in the radial direction onto the teeth 18 of the electrical machine 14 which project from the yoke 16. The electrical machine 14 in this case is a rotational machine of the external rotor type. The individual coil windings 12 cooperate to form in their totality a concentric winding of the electric machine 14 and are assigned later to individual strands for connection with each other.

The yoke 16 is designed in the known manner as a laminated core 19 with the special feature that the teeth 18 projecting from it have a winding support area 20 of trapezoidal cross section. The tooth flanks 22 of each tooth 18 form first wedge surfaces 24. The inner cross section of the coil windings 12 provided for arrangement on the teeth 18 is also of a trapezoidal shape corresponding to that of the teeth 18. The inner area 26 of the coil winding 12 lying opposite the first wedge surfaces 24 of a tooth 18 represents second wedge surfaces 28.

The winding body 10 (FIG. 1) used to produce a coil windings 12 comprises in its basic design a winding area 30, which is formed by an isosceles trapezoid-shaped winding support 32, and two sidepieces 34, 36, which form the boundaries of the winding area 30 and which are connected to the winding support 32. The length of the sidepieces 34, 36 is approximately the same as that of the head of the coil winding 12 to be mounted, i.e., as the length of the part of the winding which projects beyond the end surface of the yoke 16.

Figure 4:
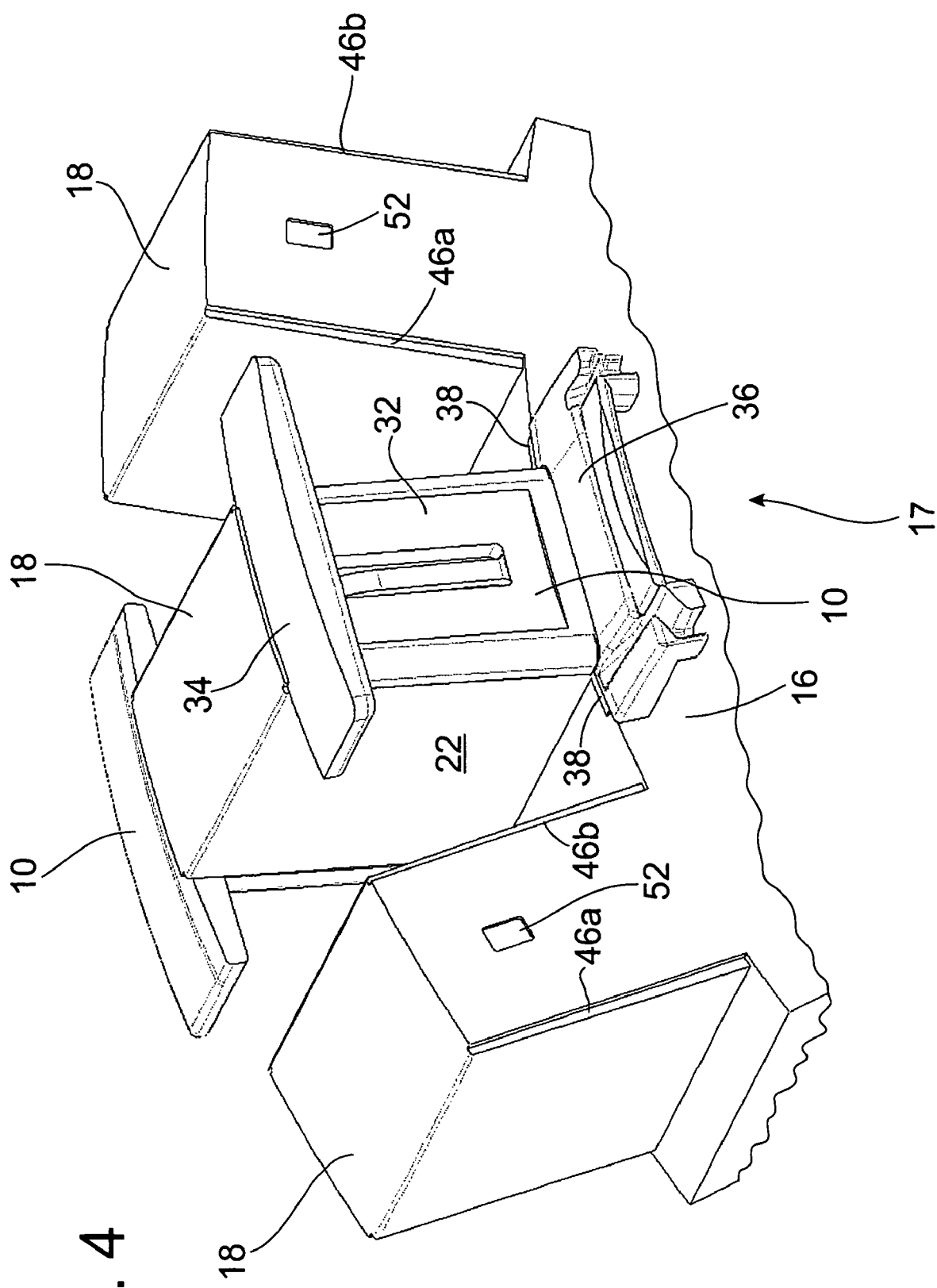
FIG. 4 is an illustrative schematic diagram of a winding arrangement on a tooth of an electric machine obtained by the use of the winding body shown in FIG. 1.

FIG. 4 shows part of the stator 17 of an external rotor electric machine with the yoke 16 and the radially outward-pointing teeth 18. Only two winding bodies 10 are shown on the central tooth 18, and for the sake of clarity, the coil winding 12 is not shown.

Figure 3:
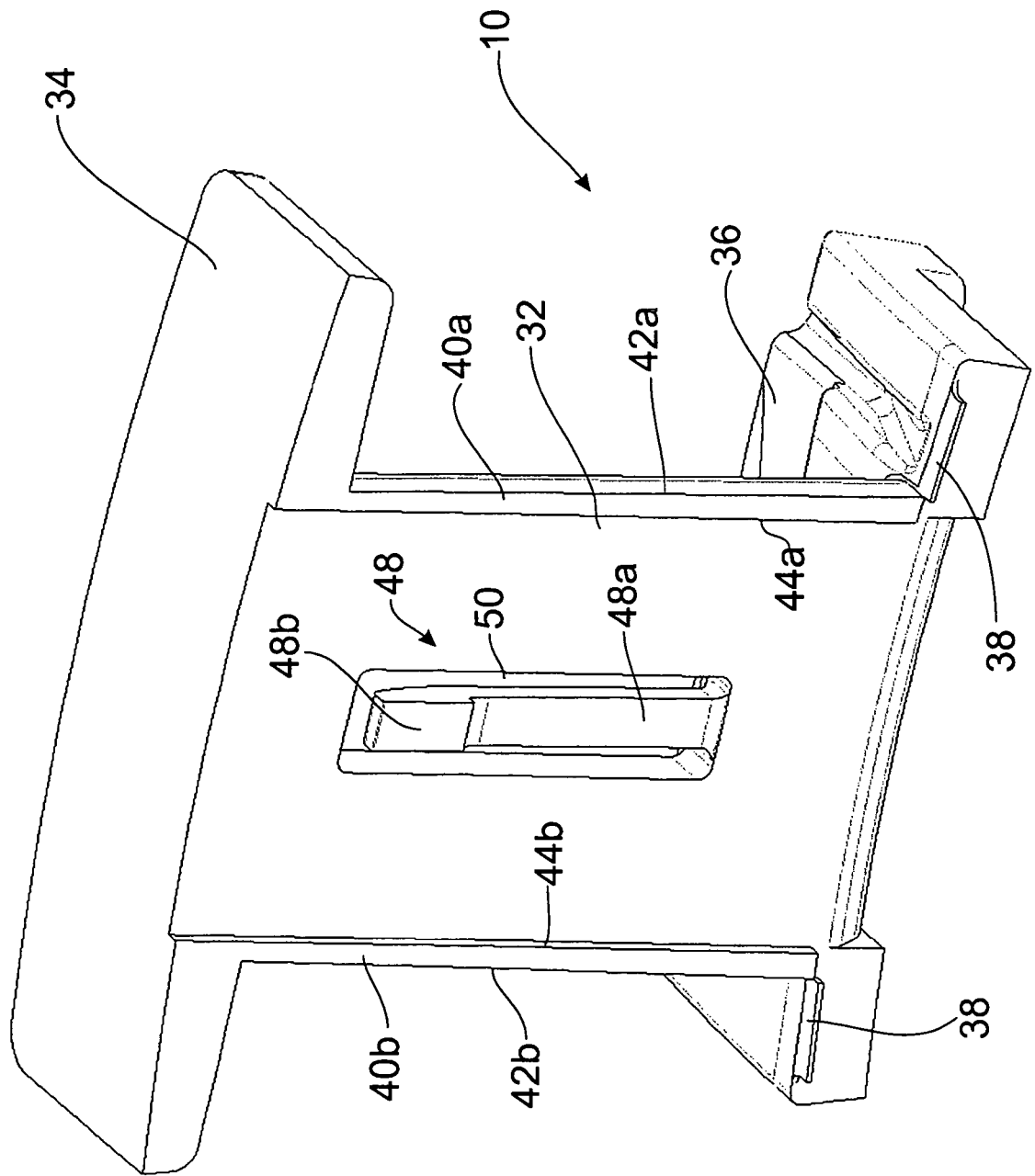
FIG. 3 is an illustrative rear view of the winding body according to FIG. 1.

It can be seen in FIGS. 3 and 4 that the yoke-side sidepiece 36 of the winding body 10 mounted on tooth 18 has a support section 38, which extends over at least part of the yoke 16. This support section 38 represents a stop, which acts during the process of setting the winding body 10 down on a tooth 18 in the direction toward the yoke 16.

For the lateral fixation of a coil winding 12 on the stator 17, that is, for fixation in the circumferential direction, it can be seen in FIG. 3 that two retaining webs 40a, 40b or retaining edges are provided in the edge areas of the winding support 10 to form a retaining formation. The retaining edges 40a, 40b can project beyond the rear support surface of the winding support 32, and the narrow parts of the edges, which project in the axial direction, can grip at least parts of the flanks 22 of the tooth 18 on the stator 17. For this purpose, the edges 40a, 40b need to project only slightly. The outer edges 42a, 42b of the webs 40a, 40b extend in a wedge-like manner toward the yoke 16 in correspondence with the trapezoidal shape of the winding support 32. The inner edges 44a, 44b are parallel to each other and engage in recesses 46a, 46b formed in the end surface of the tooth 18 and thus function as centering means 44a, 44b. When the winding body 10 is set down onto the tooth 18, the winding body 10 is guided securely and positioned on the tooth 18 without play in the circumferential direction and is also centered. It can be seen in FIG. 4 that the retaining webs 40a, 40b of two winding bodies 10 lying axially opposite each other on the tooth 18 frame between them an exposed area of a tooth flank 22, i.e., an area not covered by a winding body 10. This exposed area is designed to be as large as possible, so that dissipation heat can be effectively transferred from a coil winding 12 to the tooth 18 and from the tooth 18 to the yoke 16.

To secure a coil winding 12 in position on a stator tooth 18, the winding support 32 is provided with a locking device 48 which comprises a locking tab 48a. One end of the locking tab 48a is attached to the winding support 32. The locking tab 48a secures a coil winding 12 specifically in the radial direction, preventing the coil winding 12 from being pushed down too far onto the tooth 18. The locking tab 48a is arranged with freedom to pivot inside a recess 50 provided in the winding support 32. The other end of the locking tab 48a includes a locking projection 48b which can engage in a corresponding recess 52 in a stator tooth 18, where it locks the winding support 32 in position.

Figure 5:
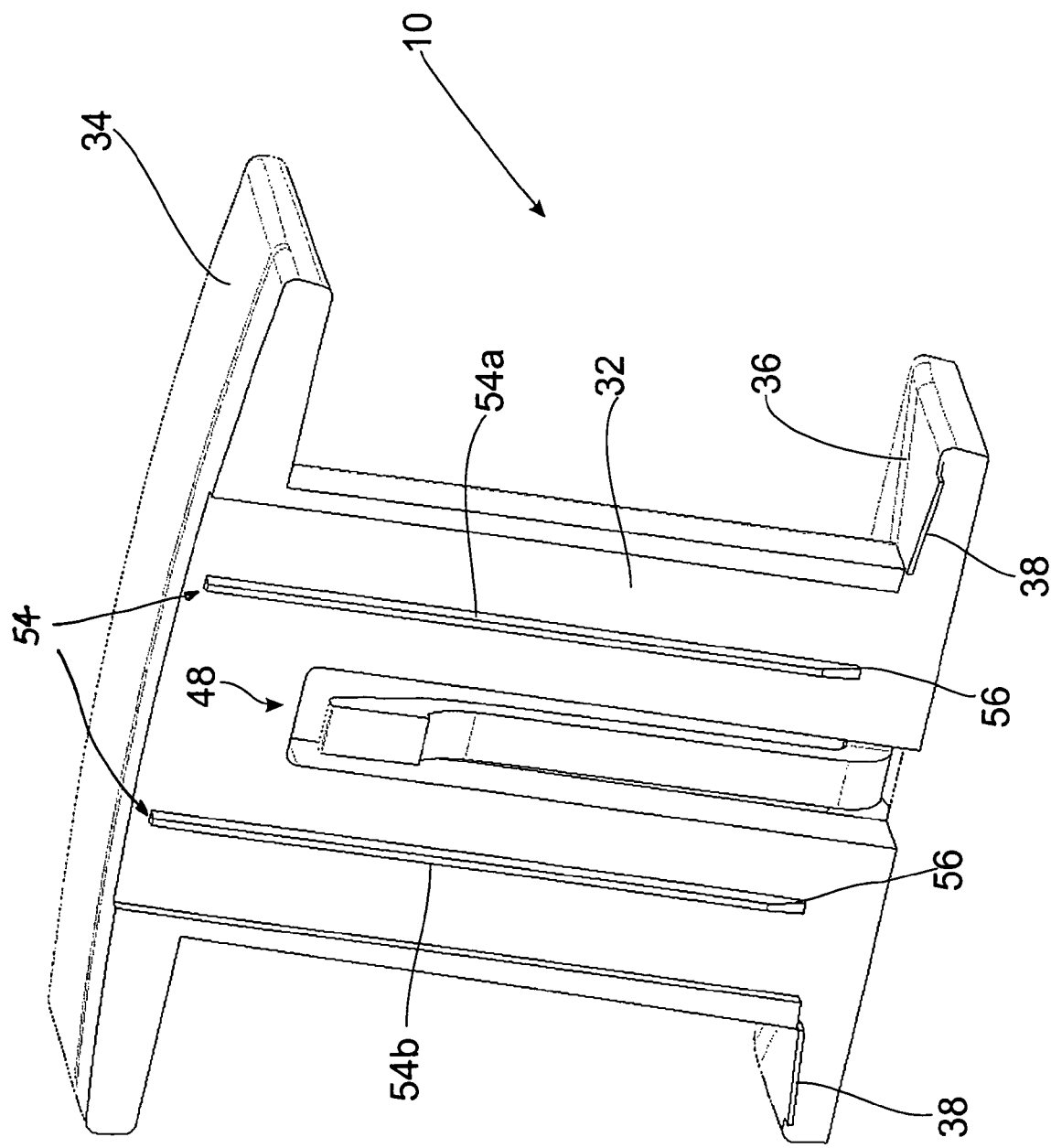
FIG. 5 is an illustrative diagram of the rear side of a winding body including a compensating means, according to one embodiment of the invention.

For the play-free installation of the coil windings 12, specifically in the axial direction of the stator 17, compensating means 54 for compensating for the difference between the length of a tooth 18 and the length of the coil winding 12 mounted on it are provided on the side of the winding support 32 facing the stator tooth 18, i.e., on the side facing away from the coil winding 12. The compensating means 54 comprise deformable and/or shearable webs 54a, 54b, as can be seen in the view of the rear side of a slightly modified winding body 10 in FIG. 5. The webs 54a, 54b have a feed bevel 56 and can be plastically deformed as the coil winding 12 is being pushed down onto a tooth 18 as a function of the quality of the fit present there. The coil winding 12 can therefore be installed on the stator tooth 18 so that it will not move even under the influence of the vibrations, which occur during operation.

In FIGS. 1 and 3-5, the front surface of the winding support 32 can also have, at least in the edge areas, a profiling (not shown) in the form of closely adjacent grooves or notches to guide the electric conductor. The notches are offset from each other by a distance equal to the effective cross section of the conductor in this direction. When round wires are used, the distance will be equal to the diameter of the wire.

In the lower sidepiece 36 of the winding body 10 shown in FIG. 1, a groove 58 is formed to hold an end of the coil winding 12. This groove 58 starts approximately at the edge of the winding support 32 and extends to the free end of the sidepiece 36. The groove is open to the winding area 30. The depth of the groove 58 increases toward the free end of the sidepiece 36, as a result of which it is ensured that the start of the winding, i.e., the first end of the coil winding 12 to be laid, does not interfere with the laying of the windings on the winding body 10 and with the build-up of the winding. The coil winding 12 can thus have a very high copper space factor.

The depth of the groove 58 corresponds over most if its length to the effective cross section of the winding conductor in the depth direction.

At the free end of the sidepiece 36, two feed sections 60a, 60b are provided to hold the ends of the coil winding 12. The feed section 60a on the left shown in FIG. 1 merges with the groove 58 and is intended to hold the first end of the coil winding 12, whereas the feed section 60b on the right shown in FIG. 1 is intended to hold the second end of the winding. Both feed sections 60a, 60b are designed to project more-or-less at a right angle from the sidepiece 36. Consequently, the coil ends are oriented toward a wiring arrangement located underneath the coil winding 12 and can be connected there.

As part of the production of a coil winding 12, it is necessary to surround the coil winding 12 with a suitable insulating layer, such as groove insulating paper, which is laid in the winding body 10 right at the beginning of the winding process and is held in place by the winding body during the winding process.

The winding support 32 is designed at the transition between the winding area 30 and the tooth flanks 22 with a predetermined radius in the direction in which the winding conductor extends. The radius is less than or equal to a predetermined minimum bending radius. The separation points between the winding support 32 and the tooth flanks 22, i.e., the outer edges 42a, 42b, are located outside the area where the winding conductor bends.

Figure 6:
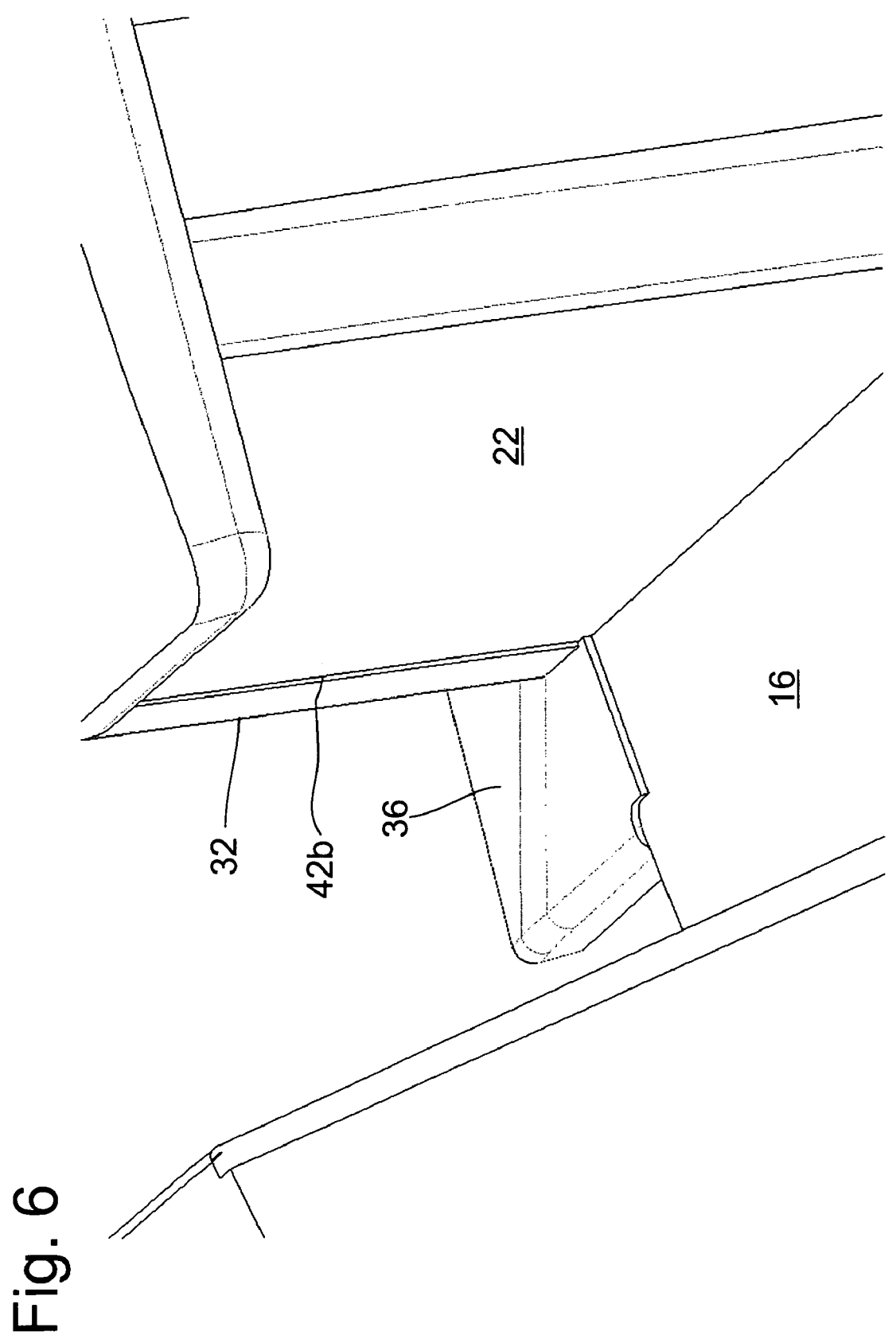
FIG. 6 is an illustrative diagram of part of a winding body arranged on a tooth, according to one embodiment of the invention.

As shown in FIG. 6, after installation on the tooth 18, the winding support 32 projects by a defined distance beyond each of the tooth flanks 22, so that, between the flank and the coil winding 12, a capillary gap remains. During the impregnation of the stator 17, an impregnating resin can penetrate into the capillary gap without the danger of leaking out. Another capillary gap of this type is formed between the coil winding 12 and the yoke 16.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A winding arrangement for an electric machine, comprising:
   a laminated core comprising a yoke and a plurality of teeth projecting from the yoke, each of the teeth having flanks that respectively form first wedge surfaces and a winding support area having a trapezoidal cross-section, wherein respective ends portions of the teeth remote from the yoke are not broadened;
   at least one coil winding arranged on one of the plurality of teeth;
   at least one winding body, the at least one coil winding being arranged on the one of the plurality of teeth using the at least one winding body, the at least one coil winding having inner areas arranged opposite the first wedge surfaces that form second wedge surfaces, the at least one winding body comprising retaining edges arranged at an edge area of the winding support area leaving substantially all of the flanks of the teeth exposed;

a stop disposed on at least one of the at least one winding body and one of the plurality of teeth, the stop being configured to limit movement of the at least one winding body in a direction toward the yoke;

a centering means configured to center the at least one winding body on the one of the plurality of teeth; and a capillary gap filled with an impregnating agent formed at an interface area between the teeth flanks and the at least one coil winding, whereby a short transfer distance is provided for heat transfer from the at least one coil winding to the plural teeth.

2. The winding arrangement according to claim 1, wherein the at least one winding body comprises compensating means configured to compensate for a difference between the length of one of the plurality of teeth and a length of the coil winding mounted on the one of the plurality of teeth.

3. The winding arrangement according to claim 1, wherein the at least one winding body comprises a winding area comprising a trapezoidal winding support, and a first sidepiece and a second sidepiece connected to the winding support, the sidepieces forming boundaries of the winding area.

4. The winding arrangement according to claim 1, wherein the stop and the centering means are formed jointly on at least one of the at least one winding body and the one of the plurality of teeth.

5. The winding arrangement according to claim 1, wherein the centering means is formed on the winding body to cooperate with the flanks of the one of the plurality of teeth.

6. The winding arrangement according to claim 1, wherein the one of the plurality of teeth comprises recesses located at transitions from an end surface to the flanks, and wherein webs engage the recesses on both sides of the winding support and extend as far as the yoke.

7. The winding arrangement according to claim 1, wherein at a transition from the winding support area to the flanks, the winding support has a predetermined radius in the direction in which a winding conductor extends, the radius being less than or equal to a predetermined minimum bending radius of the winding conductor.

8. The winding arrangement according to claim 1, wherein a separation point between the winding support and the flank is located outside the area where a winding conductor bends.

9. The winding arrangement according to claim 1, wherein after installation on the one of the plurality of teeth, the winding support projects beyond the flanks by a defined amount.

10. The winding arrangement according to claim 1, wherein a sidepiece at the yoke end of a tooth comprises a support section that extends at least part of the way over the yoke.

11. The winding arrangement according to claim 1, wherein the winding support comprises a locking device configured to lock the winding support to the one of the plurality of teeth.

12. The winding arrangement according to claim 1, wherein the capillary gap is sized such that the impregnating agent can enter the interface area as a result of capillary action without leaking out.

13. A winding arrangement for an electric machine, comprising:

a laminated core comprising a yoke and a plurality of teeth projecting from the yoke, each of the teeth having flanks that respectively form first wedge surfaces and a winding support area having a trapezoidal cross-section;

at least one coil winding arranged on one of the plurality of teeth;

at least one winding body, the at least one coil winding being arranged on the one of the plurality of teeth using the at least one winding body, the at least one coil winding having inner areas arranged opposite the first wedge surfaces that form second wedge surfaces;

a stop disposed on at least one of the at least one winding body and one of the plurality of teeth, the stop being configured to limit movement of the at least one winding body in a direction toward the yoke;

a compensating means comprising a deformable or shearable web disposed on a side of the winding support facing the one of the plurality of teeth;

a centering means configured to center the at least one winding body on the one of the plurality of teeth; and a capillary gap filled with an impregnating agent formed at an interface area between the teeth flanks and the at least one coil winding, whereby a short transfer distance is provided for heat transfer from the at least one coil winding to the plural teeth.

* * * * *